2,708,677

THIOETHERS AND A PROCESS FOR THEIR PRODUCTION

Hans Suter, Dorflingen, and Ernst Habicht, Schaffhausen, Switzerland, assignors to Cilag Limited, Schaffhausen, Switzerland, a Swiss company No Drawing. Application August 22, 1951, Serial No. 243,154

Claims priority, application Switzerland August 23, 1950

3 Claims. (Cl. 260—490)

This invention relates to a series of new thioethers of the general formula

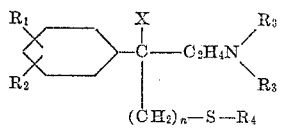

in which $R_1$ and $R_2$ are hydrogenatoms, halogenatoms, hydroxy- or alkoxy groups, X is a hydrogen atom, a cyano-, an aminomethyl-, ureidomethyl-, nicotinylamino-methyl-, methoxy-, acetyloxymethyl- or an acyl group, and $R_3$ denotes lower alkyl radicals, $R_4$ a lower alkyl- or aralkyl radical and $n$ denotes the integers 1 or 2.

It has been ascertained that compounds of the foregoing formula possess a powerful antispasmodic effect in the case of spasms induced by histamine: they are moreover to some extent very effective as analgesics.

The fact that compounds of the foregoing general formula should be effective in this way is quite unpredictable from the literature and is therefore surprising. Thus, A. M. Lands et al. (Journal of Pharm. and Exptl. Therapy 96, pp. 1 to 10 (1949)) investigated the properties of basic substituted arylacetonitriles and found that although they were effective with barium chloride spasms and partly so in the case of acetyloholine cramp, they were on the contrary ineffective against histamine-induced spasms. The compounds of the present invention also possess in contradistinction to the substances described by Lands a remarkably low toxicity. Thus in the case of the basic substituted aryl-acetonitriles Lands has found a mean intravenous toxicity of 5 to 60 mg./kg. body weight with white mice, whereas the corresponding value for the nitriles of the present invention was shown to be 100 to 120 mg./kg. body weight.

The invention relates moreover to an advantageous process for the preparation of the substances described in the foregoing.

According to this process, a compound of the formula

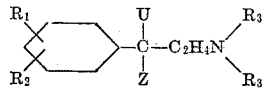

wherein $R_1$, $R_2$ and $R_3$ have the significance mentioned in the foregoing, U is a cyano-radical or acylradical and Z is a residue which can be readily split off, such as for example a hydrogen or metal atom, is caused to react with a compound of the formula $$R_4—S—(CH_2)_n—Y \qquad II$$

wherein Y is a halogen atom or a compound of the formula

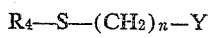

wherein $R_1$, $R_2$, $R_4$, U and Z have the significance mentioned in the foregoing, is caused to react with a compound of the formula

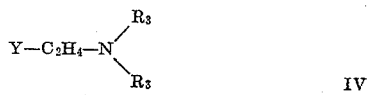

wherein $R_3$ and Y have the significance mentioned in the foregoing, and in either case the cyano residue U in the reaction product is subsequently as the case may be either converted by reduction into the aminomethyl residue and the latter in its turn into the nicotinyl-aminomethyl residue, or into the ureidomethyl residue, or said aminomethyl residue is converted by diazotisation and acylation into the acetoxymethyl residue, or is converted by reaction with sodamide into the hydrogen atom, or is converted by reaction with an alkyl magnesium halide into an acyl residue, and the tertiary amino groups of the basic side chains are converted into a quaternary ammonium group by reaction with an alkyl halide. The reaction of a substituted phenyl acetonitrile of the Formula I or III with an alkyl-thioalkylhalogenide II or a dialkylaminoalkylhalogenide IV is preferably carried out in an inert solvent such as for example benzene, toluene, xylene.

The process is preferably carried out in the presence of a condensing agent, such as for example an alkali amide or phenyllithium. In such case the alkali salt of a nitrile I or III may first be formed and then reacted with a halogenide of the Formula II or IV, or a nitrile I or III may be caused to react direct in the presence of the condensing agent with a halide of the Formula II or IV.

The reduction of the cyano group U to the aminomethyl group may be carried out in an alcoholic ammonia solution with the aid of catalytically activated hydrogen. It has proved very advantageous to carry out the reduction with lithium aluminum hydride in ether. The conversion of the aminomethyl residue into the ureidomethyl residue is effected by reacting the base in acid solution with potassium cyanate or by heating with nitrourea in water. The nicotinylation can be carried out with nicotinylchloride or nicotinic anhydride.

The cyano residue U may be split off using an alkali amide, preferably with sodamide in a hydrocarbon, with heating.

If attempts be made to react a disubstituted nitrile of the foregoing formula with an alkyl magnesium halide, the reaction is very sluggish. For this reason, the tertiary amino groups of the basic side chains are first converted into quaternary groups, this quaternary salt being then caused to react. In this way quaternary salts of ketones of the formula

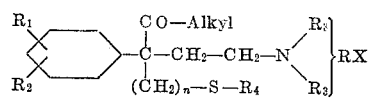

are obtained. By dry distillation of the quaternary salts, these may be reconverted into the keto bases. The yield in this sequence of reactions is however, meagre. A better route for the preparation of the ketones is as follows: A benzylalkylketone is reacted with a dialkylamino-aethylhalide or a alkylthioalkylhalide in the presence of sodamide and the resulting condensation product is brought into reaction with an alkylthioalkylhalide or with a dialkylaminoaethylhalide. In this way ketones of the formula.

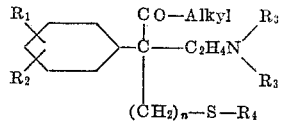

are obtained in good yield.

The purpose of converting the tertiary nitrogen atom

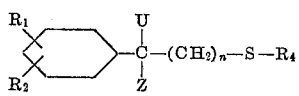

of the basic side chain into a quaternary salt is not merely to facilitate the reaction with an alkylmagnesium halide, but also to bring out an increase in the activity of the compound. In this connection it has been observed that quaternisation of the tertiary nitrogen atom of the basic side chain gives a considerable increase in activity, while the toxicity of such substances is not substantially higher than that of the basic bodies.

The invention is illustrated in a non-limitative sense in the following examples:

Example 1

407.5 g. of 1-dimethylamino-3-phenyl-3-cyanopropane are stirred into 1.1 l. of absolute toluene together with 93 g. of sodamide and to the resulting suspension is added in a thin stream a solution of 247 g. of 2-methylthioethylchloride in 800 ccs. of absolute toluene. After 2 hours have elapsed the mixture is heated for a further 3 hours to 90–95° C. and is then cooled. 2 l. of 2 N hydrochloric acid are thereupon added and the whole stirred for 10 minutes. The aqueous solution is separated off and poured cautiously into a solution of 300 g. of sodium hydroxide in 2 l. water and 500 g. ice. 0.5 l. of ether are added, the mixture thoroughly shaken up and this procedure repeated twice more. After drying and evaporation of the united ethereal extracts the residue is distilled in high vacuum. A yield of 373 g. equivalent to 66%, is obtained of the 1-dimethylamino-3-phenyl-3-cyano-5-methyl-mercaptopentane boiling at 132–135° C. under 0.005 mm. The new compound dissolves readily in dilute mineral acids and the usual organic solvents. The picrate recrystallised from methanol melts at 154–155° C.; the hydrochloride recrystallised from ethanol melts at 197–198° C. A 5% aqueous solution of the hydrochloride has a pH of 6.1–6.3.

The formula of the new compound is as follows:

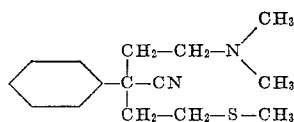

Example 2

19 g. of 1-phenyl-1-cyano-3-methylmercaptopropane (prepared from benzylcyanide and 2-methylmercaptoethylchloride in toluene with the aid of sodamide, B. P. 105–106° C./0.06 mm.) and 15 g. of 2-dimethylaminoethylbromide are dissolved in 150 ccs. of absolute toluene. 4.5 g. powdered sodamide are quickly introduced into the solution cooled to 0° C. The reaction mixture is very vigorously stirred for 1½ hours at 20° C. and then for 1 hour at 100° C. The product is worked up in the manner set forth in Example 1. A yield of 15 g. of 1-dimethylamino-3-phenyl-3-cyano-5-methylmercaptopentane, B. P. 132–135°/0.005 mm. results. The formula thereof is as follows:

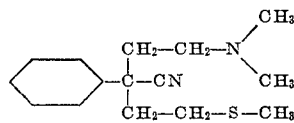

Example 3

19.2 g. of 1-dimethylamino-3-phenyl-3-cyano-5-methylmercaptopentane are refluxed for 36 hours with 10.3 g. sodamide in 150 ccs. of xylene. In order to destroy excess sodamide there is thereupon added to the mixture first 100 ccs. ethanol and then 300 ccs. of water. After washing with water the xylene layer is extracted with dilute hydrochloric acid and the extract after filtering with charcoal, is rendered alkaline. It is extracted with ether, the ethereal extract dried and the ether evaporated off and there is obtained 6–7 g. of 1-dimethylamino-3-phenyl-5-methyl-mercaptopentane B. P. 145–150° C./10 mms. Hg.

The new compound dissolves readily in dilute acids, is miscible with organic solvents and insoluble in water.

A 5% neutral solution thereof may be prepared for example, by dissolving 6 g. of the base in 25 ccs. of normal hydrochloric acid and diluting with water to 120 ccs. The formula of the new compound is as follows:

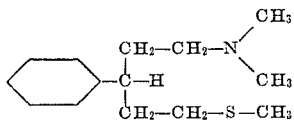

Example 4

9.1 g. of 1-dimethylamino-3-cyano-5-methylthio-3-phenylpentane are dissolved in 50 ccs. of absolute ethylacetate and a solution of 5.2 g. of methyliodide in 25 ccs. of ethylacetate added thereto. The mixture is allowed to stand for 3 days, the ethyl acetate is poured away and it is digested once with ether. After recrystallisation from acetone-ether there is obtained a yield of 13.5 g. of the N-iodomethylate of 1-dimethylamino-3-cyano-5-methylthio-3-phenylpentane, in the form of fine colourless crystals melting at 188–189° C. The quaternary salt thus obtained dissolves readily in water, ethanol, acetone, dioxane and pyridine. It is less soluble in ether, benzene and ethylacetate. The formula of the new compound is as follows:

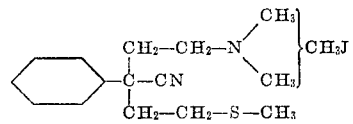

The chlormethylate, which melts at 109–110° C. and dissolves readily in water, ethanol and acetone, is obtained in precisely similar manner.

Example 5

100 g. of 4-chlorbenzylcyanide, 27 g. of sodamide and 300 ccs. of absolute benzene are stirred together for ½ hour at 0° C. The free 2-dimethylaminoethylbromide is then prepared from 165 g. of 2-dimethylaminoethylbromide hydrobromide and 36 g. of solid caustic soda in water; the free base is taken up in 300 ccs. of benzene, the solution dried and then added in a thin stream to the solution of 4-chlorbenzylcyanide. After stirring for 2 hours the reaction mixture is heated for 2½ hours to boiling and then allowed to cool. The reaction mixture is now extracted three times with 150 ccs. of 2 n hydrochloric acid, the acid solution made alkaline with concentrated caustic soda solution and the oil separating out is taken up in ether, the solution of which is dried and the ether evaporated off. The residue is distilled under high vacuum. 1-dimethylamino-3-(4'-chlorphenyl)-3-cyanopropane is obtained as a colourless oil boiling at 113–155° C./0.07 mm. The chloroplatinate of the base melts at 180–188° C. Yield: 72 g. of substance equivalent to 49% of theory. The formula of the new compound is as follows:

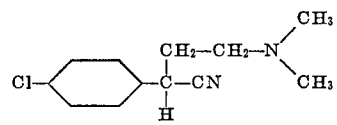

Example 6

20 g. of 1-dimethylamino-3-(4'-chlorphenyl)-3-cyanopropane are caused to react with 4 g. of sodium and 10.2 g. of 2-methylthioethylchloride in 90 ccs. of absolute toluene. The reaction mixture is stirred for 2 hours at 0°–5° C., and then for 3 hours at 80–90° C. and is then allowed to cool. The reaction mixture is treated 3 times with 30 ccs. of 2 n hydrochloric acid, the extract is rendered alkaline with caustic soda solution and the oil separating out is taken up in ether, the solution of which is dried and the ether distilled off. By distillation in high vacuum 5 g. of 1-dimethylamino-3-(4'-chlorphenyl)-3-cyano-5-methylmercaptopentane boiling at 140–149°

C./0.8 mm. are obtained. The product is still impure. The formula of this compound is as follows:

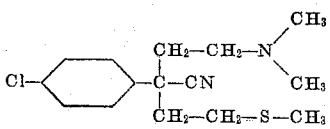

A method of obtaining this compound in better yield and with higher purity is described in the following example.

*Example 7*

17 g. of 1-(4'-chlorphenyl)-1-cyano-3-methylmercaptopropane (B. P. 130° C./0.02 mm.) and 3.6 g. of sodamide are stirred into 180 ccs. absolute toluene at 0° C. The free dimethylaminoethylbromide is isolated by decomposing 25 g. of 2-dimethylamino ethylbromide hydrobromide with 6 g. of caustic soda solution and is taken up in 100 ccs. of toluene, the solution dried and added to the reaction mixture. The mixture is stirred for 2 hours at 20° C. and then for 2½ hours at 120° C. The product is worked up in the manner set forth in Example 6. 7 g. of 1-dimethyl amino-3-(4'-chlorphenyl)-3-cyano-5-methyl mercaptopentane are obtained, boiling at 138–143° C./0.06 mm. The hydrochloride of the base recrystallised from chlorbenzene, melts at 156–158° C. The chlorplatinate melts at 115–120° C. The formula is the same as that given in Example 6.

*Example 8*

30 g. of the iodomethylate obtained according to Example 4 in 300 ccs. ether are reacted with an ethereal solution of 39.4 g. of ethyl magnesium bromide. A thick paste is produced, consisting of the magnesium salt of the ketimine. It is stirred for 2 hours at 20° C., is then treated with 300 ccs. of 20% hydrochloric acid, is heated to boiling for a short while, is then cooled and the ethereal layer is separated off. 30 g. of solid magnesium perchlorate are added to the hydrochloric acid solution, whereby the perchlorate of the quaternary ketone base is thrown down as a semicrystalline pasty mass. This is taken up in methanol, potassium chloride is added to the solution and the chloride of the quaternary ketone base separated by suction filtration. After drying said chloride is heated in the dry state for 15 minutes to 240–250° C. and then taken up in water. The aqueous solution is rendered alkaline, extracted with ether, the ethereal extract dried and the ether distilled off. By high vacuum distillation of the residue there is obtained in about 10% yield the 1-dimethylamino-3-phenyl-3-(2'-methylmercaptoethyl)-hexanone-(4) boiling at 125–130° C./0.08 mm. The formula thereof is as follows:

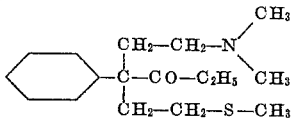

*Example 9*

The ketone described in Example 8 can also be prepared from α-(2'-methylthioethyl)-benzylethylketone, sodamide and dimethylaminoethylbromide in toluene or xylene. The formula is the same as that given in Example 8.

*Example 10*

To 30 g. of 1-dimethylamino-3-phenyl-5-methylmercapto-3-cyanopentane, dissolved in 150 ccs. of absolute ether, there is added drop by drop a suspension of 10.4 g. of lithium aluminium hydride in 200 ccs. of absolute ether, the liquid being stirred turbulently the while. After 24 hours water is cautiously added until all the excess lithium-aluminium hydride is decomposed and then 100 ccs. of 2 n acetic acid are added. The ether is distilled off from this mixture and the aqueous solution rendered alkaline with concentrated caustic soda solution. The oil separating out is taken up in ether and the united ethereal extracts are dried and the ether evaporated off. The residue is distilled in a high vacuum. There are thus obtained 26 g. of 1-dimethylamino-3-aminomethyl-3-phenyl-5-methylmercaptopentane boiling at 126–127°/0.02 mm. The new base is sparingly soluble in water and readily soluble in the usual organic solvents. The N-acetyl compound, prepared with acetic anhydride, melts at 56° C. The formula of the new compound is as follows:

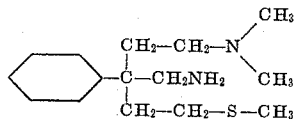

*Example 11*

To 17.1 g. of 1-dimethylamino-3-phenyl-3-aminomethyl-5-methylmercaptopentane dissolved in 70 ccs. of 2 n sulphuric acid are added a solution of 5 g. of sodium nitrite in 30 ccs. of water, the liquid being stirred turbulently and cooled the while. After half an hour the mixture is rendered alkaline with concentrated soda solution and the oxymethyl compound is extracted by shaking with ether. The ethereal extract is dried and the ether removed. The residue is dissolved in 20 ccs. of pyridine and treated with 10 ccs. of acetic anhydride. The liquid is stirred turbulently for 24 hours at 20° C. and is then evaporated down in vacuo until of an oily consistency, is treated with water and rendered alkaline with potash solution. After extraction with ether, drying and removal of the ether the residue is distilled in high vacuum. There is obtained 1-dimethylamino-3-phenyl-3-acetoxymethyl-5-methylmercaptopentane, which boils at 135–140° C./0.15 mm. The new compound is in the form of a colourless oil insoluble in water but readily soluble in dilute acids and organic solvents. The formula is as follows:

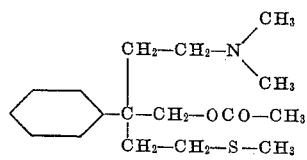

*Example 12*

To 4.5 g. of 1-dimethylamino-3-phenyl-3-aminomethyl-5-methylmercaptopentane dissolved in 36 ccs. of n-hydrochloric acid there is added drop by drop a solution of 1.5 g. of potassium cyanate in 10 ccs. of water. The reaction mixture is stirred for ½ hour at 20° C., is heated for a short while to boiling, is allowed to cool down and to stand overnight. The solution is rendered alkaline with potash and the oil separating out is extracted with chloroform. After drying the chloroform extract ether is added thereto until a crystalline precipitate is obtained. This is removed by suction filtration, is washed with ether and dried. There is thus obtained 3.5 g. of 1-dimethylamino-3-phenyl-3-ureidomethyl-5-methylmercaptopentane, which melts at 139–140° C. The new compound dissolves rather readily in cold water, very readily in ethanol and chloroform and sparingly in ether and petrol ether. The formula of the new compound is as follows:

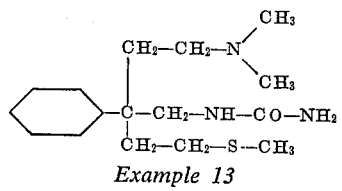

*Example 13*

4 g. of 1-dimethylamino-3-phenyl-3-aminomethyl-5-mercaptopentane and 6.85 g. of nicotinic anhydride are heated together to 120° C. in the absence of a solvent. After half an hour the reaction mass is cooled and taken up in ether and the ethereal solution is shaken with sodium bicarbonate solution in order to remove excess nicotinic acid. The ether is then distilled off, 20 ccs. of saturated alcoholic hydrochloric acid are added to the liquid which is then cooled. There are obtained 4 g. of the hydrochloride of 1-dimethyl-amino-3-phenyl-3-nicotinylaminomethyl-5-methylmercaptopentane, which melts at 150–151° C. The formula of the new compound is as follows:

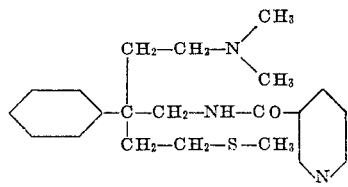

The following compounds may be obtained in an analogous manner:

1-dimethylamino - 3 -(4'- methoxyphenyl)- 3 - cyano-5-methylmercaptopentane from 1-dimethylamino - 3 -(4'-methoxyphenyl)-3-cyanopropane and 2-methylthioethylchloride in absolute xylene with sodamide.

1-dimethylamino - 3 -(2'- methoxyphenyl)- 3 - cyano-5-methylmercaptopentane from 1-dimethylamino - 3 -(2'-methoxyphenyl)-3-cyanopropane and 2-methylthioethylchloride in xylene with sodamide.

1-dimethylamino-3-(3'- 4'- methylene dioxyphenyl)-3-cyano-5-benzylmercaptopentane from 1-dimethylamino-3-(3',4' - methylenedioxyphenyl) - 3 - cyanopropane and 2-benzylthioethylchloride in xylene with sodamide.

What we claim is:

1. New basic thioethers of the general formula

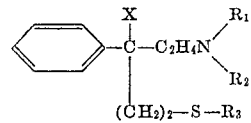

wherein $R_1$, $R_2$ and $R_3$ are lower alkyl radicals, and X is a substituent selected from the group consisting of —$CH_2$—O—CO—$CH_3$ and CO—R, wherein R is a lower alkyl.

2. The chemical compound of the formula:

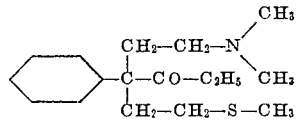

3. The chemical compound of the formula:

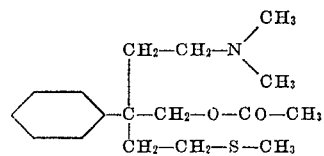

No references cited.